US012791415B2

(12) United States Patent
Decker

(10) Patent No.: US 12,791,415 B2
(45) Date of Patent: Nov. 10, 2026

(54) TEST GAS APPLICATOR

(71) Applicant: INFICON GMBH, Cologne (DE)

(72) Inventor: Silvio Decker, Cologne (DE)

(73) Assignee: INFICON GMBH, Cologne (DE)

( * ) Notice: Subject to any disclaimer, the term of this patent is extended or adjusted under 35 U.S.C. 154(b) by 385 days.

(21) Appl. No.: 17/780,897

(22) PCT Filed: Dec. 30, 2020

(86) PCT No.: PCT/EP2020/088047

§ 371 (c)(1),
(2) Date: May 27, 2022

(87) PCT Pub. No.: WO2021/144140

PCT Pub. Date: Jul. 22, 2021

(65) Prior Publication Data

US 2023/0020261 A1 Jan. 19, 2023

(30) Foreign Application Priority Data

Jan. 15, 2020 (DE) .................... 10 2020 100 830.9

(51) Int. Cl.
*G01M 3/00* (2006.01)
*G01M 3/20* (2006.01)

(52) U.S. Cl.
CPC .............. *G01M 3/007* (2013.01); *G01M 3/20* (2013.01); *G01M 3/207* (2013.01)

(58) Field of Classification Search
CPC .......... G01M 3/007; G01M 3/04; G01M 3/20; G01M 3/207
See application file for complete search history.

(56) References Cited

U.S. PATENT DOCUMENTS

| | | | | |
|---|---|---|---|---|
| 3,209,579 | A | 10/1965 | Roberts | |
| 7,422,627 | B2 * | 9/2008 | Wetzig | G01M 3/207 95/45 |
| 8,881,576 | B2 * | 11/2014 | Schwartz | G01M 3/38 73/40.7 |
| 11,846,566 | B2 * | 12/2023 | Thenard | G01M 3/3281 |
| 2016/0146694 | A1 | 5/2016 | Decker | |
| 2016/0195448 | A1 | 7/2016 | Widt | |

FOREIGN PATENT DOCUMENTS

| | | | |
|---|---|---|---|
| DE | 20 2010 003426 | U1 | 8/2011 |
| JP | S5998342 | U | 7/1984 |
| JP | H08219929 | A | 8/1996 |

OTHER PUBLICATIONS

Inficon, Test Leak, Aug. 2011, FIT Machine Translation (Year: 2011).*

International Search Report and Written Opinion dated Apr. 15, 2021, which issued in the corresponding European Patent Application No. PCT/EP2020/088047.

* cited by examiner

*Primary Examiner* — Erika J. Villaluna
(74) *Attorney, Agent, or Firm* — Dickinson Wright PLLC

(57) ABSTRACT

A test gas applicator (10) for administering test gas to a test object to be tested for the presence of a leak, comprising a housing (12) surrounding a test gas volume (14) and having a test gas outlet (24) with a membrane material (28) through which the test gas diffuses and/or permeates.

10 Claims, 1 Drawing Sheet

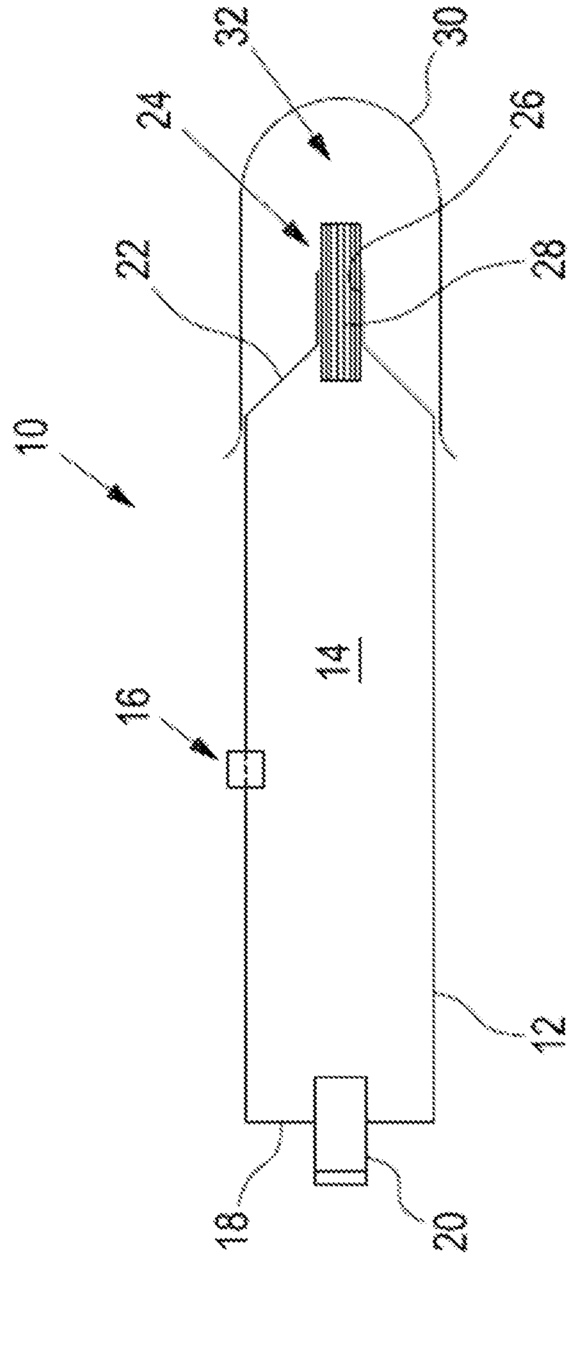
32
30
24
26
22
28
10
14
16
12
18
20

TEST GAS APPLICATOR

The invention relates to a test gas applicator for administering test gas to a specimen to be tested for tightness.

In vacuum leakage detection, specimen are tested for gas tightness. For this purpose, it is known to introduce a test gas, e.g. helium or hydrogen, into the external environment of the specimen, while the specimen is evacuated and the gas sucked out of the specimen is tested for the presence of test gas. If the gas sucked out of the specimen contains test gas, this is an indication of the presence of a leak.

In conventional test gas applicators, the test gas is typically taken from a pressure vessel and administered to the external environment of the specimen using a spray gun. A disadvantage is that the test gas supply must be filled under pressure and that more test gas than required is usually administered when administering the test gas. Furthermore, an excessively large cloud of test gas in the vicinity of the specimen makes it difficult to locate a leak.

An object of the invention is to provide an improved test gas applicator.

The test gas applicator according to the invention is defined by the features of claim 1.

Accordingly, the test gas volume is surrounded by a housing comprising a test gas outlet that connects the test gas volume to the atmosphere of the test gas applicator surrounding the housing. The test gas outlet comprises such a membrane material that the test gas diffuses through and/or permeates from the membrane material.

This allows the test gas to be applied from the test gas volume without the test gas in the housing being pressurized relative to the external atmosphere. This eliminates the need for complex pressure-reducing technology. Due to the principle of diffusion/permeation of the test gas, a small amount of the test gas flows continuously out of the test gas applicator so that the test gas concentration is only increased in the immediate vicinity of the test gas outlet. The test gas applicator can be moved along the test object to detect the leak.

The test gas outlet can be closed with a cap.

The housing may be cylindrical and pin-like, wherein the test gas outlet is concentrically formed in the region of a distal end of the housing. A filling valve may be provided on the side opposite the test gas outlet. The housing may comprise a pressure relief valve in the region of its shell surface, for example, to ensure that the test gas within the housing only comprises atmospheric pressure.

Advantageously, the test gas can be helium. The membrane material is configured such that the test gas diffuses therethrough without that a pressure difference prevails between the interior of the housing and the atmosphere surrounding the test gas applicator.

The membrane material can be an open-pored felt material. In particular, the test gas applicator can be designed like a felt pin. Test gas can pass through the pores of the felt material by diffusion.

Alternatively, the membrane material can be a pore-free, closed material, e.g. a silicon material, through which the test gas can pass by permeation.

In the following, an exemplary embodiment of the invention is described in detail with reference to the FIGURE.

The FIGURE shows a longitudinal section through the test gas applicator.

The test gas applicator 10 comprises a cylindrical housing 12 that entirely surrounds a test gas volume 14 on the outside. A pressure relief valve 16 is provided in an outer shell surface of the housing 12 to allow a pressure within the housing 12 in excess of 110% of atmospheric pressure not to be exceeded when the test gas applicator 10 is filled with test gas.

A filling valve 20 is provided on a rear proximal front face 18 of the housing 12 for filling the test gas volume 14.

The distal front face 22 of the housing 12 opposite the proximal front face 18 comprises a test gas outlet 24 in the form of a cylindrical opening 26. A membrane material 28 is disposed in the cylindrical opening 26, which is configured such that the test gas diffuses through and/or permeates from the membrane material 28. The test gas passes completely through the membrane material 28 solely by diffusion. A pressure difference on the opposite sides of the membrane material 28 is not required for this purpose.

The membrane material 28 is a felt material which is provided in the form of a cartridge pressed into a cylindrical form.

A cylindrical cap 30 is configured to be slid onto the distal end of the housing 12 in a gas-tight manner such that no test gas gets from the test gas volume 14 to the external environment of the cap 30.

The test gas volume 14 is filled through the filling valve 20 with test gas in the form of helium. The pressure relief valve 16 prevents that the pressure within the housing 12 exceeds 110% of the atmospheric pressure in the external environment of the test gas applicator 10. Once the test gas volume is sufficiently filled, the cap 30 can be removed to introduce the test gas into the external environment of the specimen to be tested, causing the test gas to diffuse from the test gas volume 14 through the membrane material 28 and the test gas outlet 24. In doing so, only a small amount of test gas flows out of the test gas applicator 10 compared to conventional pressurized test gas applicators with spray guns. The tip 32 of the test gas applicator 10 can be passed over the surface of the specimen so that when the amount of test gas in the gas sucked out of the specimen increases, the tip 32 of the test gas applicator 10 is in the area of the leak of the specimen. Typically, the distal tip 32 then points towards the leak. Localizing a leak is thus possible in a particularly simple manner.

The invention claimed is:

1. A test gas applicator for administering test gas to a test object to be tested for the presence of a leak, comprising a housing surrounding a test gas volume and having a test gas outlet with a membrane material through which the test gas diffuses and/or permeates, wherein the housing is elongated and substantially cylindrical, and wherein the test gas outlet is provided concentrically at a distal end of the housing, the test gas outlet is provided as a cylindrical opening in the housing, a first end of said opening abuts the test gas volume and a second end opposite the first end of said opening abuts the atmosphere surrounding the test gas applicator, such that the test gas outlet comprises a constant diameter along its entire length from its first end to its second end, the membrane material completely fills out said cylindrical opening from its first end to its second end, wherein the membrane material extends from the test gas outlet into the test gas volume, and the test gas applicator, the test gas outlet and the membrane material are configured to convey the test gas solely by diffusion and/or permeation from the test gas volume to the atmosphere surrounding the test gas applicator.

2. The test gas applicator according to claim 1, characterized in that the membrane material is configured to diffuse or permeate gas contained in the test gas volume at atmospheric pressure into the atmosphere surrounding the test gas applicator.

3. The test gas applicator according to claim 1, characterized in that the membrane material is an open-pored felt material or a pore-free, closed membrane material.

4. The test gas applicator according to claim 1, characterized in that the housing comprises a filling valve.

5. The test gas applicator according to claim 1, characterized in that the housing comprises a pressure relief valve.

6. The test gas applicator according to claim 1, characterized in that the test gas applicator comprises a safety cap completely covering and closing the test gas outlet when fitted on the housing.

7. The test gas applicator according to claim 1, characterized in that the membrane material extends from the test gas outlet into the test gas volume.

8. The test gas applicator according to claim 1, characterized in that the test gas volume comprises a test gas with atmospheric pressure.

9. The test gas applicator according to claim 1, characterized in that the membrane material is an open-pored felt material or a pore-free, closed membrane material comprising a silicon material.

10. A test gas applicator for administering test gas to a test object to be test-ed for the presence of a leak, comprising a housing surrounding a test gas volume and having a test gas outlet with a membrane material through which the test gas diffuses and/or permeates, wherein the housing is elongated and substantially cylindrical, and wherein the test gas outlet is provided concentrically at a distal end of the housing, the test gas outlet is provided as a cylindrical opening in the housing, which cylindrical opening has a smaller diameter than the adjoining upper portion of test gas volume, a first end of said opening abuts the test gas volume and a second end opposite the first end of said opening abuts the atmosphere surrounding the test gas applicator, such that the test gas outlet comprises a constant diameter along its entire length from its first end to its second end, the membrane material completely fills out said cylindrical opening from its first end to its second end, and the test gas applicator, the test gas outlet and the membrane material are configured to convey the test gas solely by diffusion and/or permeation from the test gas volume to the atmosphere surrounding the test gas applicator.

* * * * *